United States Patent [19]
Robinson et al.

[11] 3,885,326
[45] May 27, 1975

[54] EDUCATIONAL METHOD AND APPARATUS

[76] Inventors: Madeleine O. Robinson, 80 Chestnut Ave., Cranston, R.I. 02910; Paul F. Burton, 14 Wolcott Ave., Andover, Mass. 01810

[22] Filed: Oct. 9, 1973

[21] Appl. No.: 404,348

Related U.S. Application Data

[63] Substitute for Ser. No. 753,019, Aug. 13, 1968, abandoned.

[52] U.S. Cl................................... 35/35 J; 35/71
[51] Int. Cl......................... G09b 17/00; G09b 1/06
[58] Field of Search....... 35/35 R, 35 H, 35 J, 31 H, 35/69, 70, 71; 273/152 R

[56] References Cited
UNITED STATES PATENTS

| | | | |
|---|---|---|---|
| 1,490,934 | 4/1924 | McDade | 35/31 R |
| 2,756,515 | 7/1956 | Hoffman | 35/35 R |
| 3,206,872 | 9/1965 | Nason et al. | 35/31 H |
| 3,389,480 | 6/1968 | Holland | 35/35 J |

*Primary Examiner*—Wm. H. Grieb
*Attorney, Agent, or Firm*—Morse, Altman, Oates & Bello

[57] ABSTRACT

This invention relates of a system for vocabulary self-instruction and a method of teaching vocabulary skills which involves the concepts of both working and recognition vocabulary. The invention lends itself to a great variety of materials such as cards, books, slides, transparencies, etc. In particular, a word to be learned is presented through a sequence which gives its part of speech, syllabication, phonetic spelling, use in a sentence, an easy and a difficult synonym by way of definition, an approximate opposite meaning and, when appropriate, a widely known word element(s) of the word. All the words to be learned are categorized by part of speech which are indicated by various colors. Testing devices such as shields to cover parts of the above sequence and a desk top stand are herein described in the specification and claims.

3 Claims, 18 Drawing Figures

INVENTORS
M.O. ROBINSON
P. BURTON

INVENTORS
M.O. ROBINSON
P. BURTON

EDUCATIONAL METHOD AND APPARATUS

BACKGROUND OF THE INVENTION

In general, it is the object of this invention to create more interest in vocabularly skills through the use of vocabulary cards with the novel employment of a color code for more thorough learning and manipulation and the use of the quiz-card holder testing device for self-teaching, book shield tester should material be put in book form and the desk top vocabulary stand and self-tester.

The present invention has been made in view of the problem involved in learning vocabulary skills and in particular with a view to producing a vocabulary usable by the student and the adult, the usage of which should increase his sense of self-reliance and of self-confidence.

This invention relates to an improved system of teaching, and more particularly to an improved system of learning vocabulary skills using color coded visual aids and self-teaching aids. The application of this system is highly rewarding in terms of increased word power, competence in verbal and written communication, all of which is of basic importance in education and business. Inadequate vocabulary skills can handicap one's communication and, therefore, hinder academic achievement and success in the commercial world.

Vocabulary learning in the United States has been neglected. Out of the one million words in the English language, the average man is estimated to have only 20,000 words at his command. The student or adult is frequently confronted with many thousands of words that are unfamiliar to him. The object of the invention is to provide an improved educational device and system more especially designed as an aid in learning both working and recognition vocabulary by concentration on syllabication, on phonetic spelling, on practical usage in sentence form and on association with similar and dissimilar meanings of the word to be learned. Also, in most cases a break-up of the word into familiar word elements is presented. The latter increases recognition vocabulary and encourages interest in etymological search. Another object is to enable an instructor to readily set up vocabulary study problems and test without requiring blackboard use or the like.

A further object of the invention is to provide for the student or adult a device, i.e. test card holder, desk stand, book shield, for a self-testing quiz on the vocabulary presented in the system. By manipulation of one of these devices, the student is rewarded by a quick and accurate check of familiarity with the word being learned and its suggested meanings.

The student may himself reread the color coded vocabulary cards, read his inscribed response on the erasable plastic, or other material, quiz-card holder. Hence, his answer can easily be checked either by the student or by some other person.

By the use of this invention the student may obtain desired information without the aid of a teacher and at a pace tailored to his own capabilities. Ordinarily, the answering of each question on the quiz-card holder of the color coded vocabulary card requires a thorough understanding of the vocabulary card covered by the quiz holder. Therefore, an individual is often able to master the color coded vocabulary card which he might fail to learn solely through reading a book on vocabulary building or the memorized word approach often found in the classroom. Furthermore, this device tends to improve the reading abilities of the user and to reinforce the learning process at a time when such reinforcement is considered to be particularly beneficial.

An additional object of our invention is to provide a plural sectional structure, i.e. desk stand, for containing the color coded vocabulary cards; half in the upper case has an aperture showing only the "new word;" the half encased deck of color coded vocabulary cards in the lower section is completely visable. This desk top vocabulary card stand is noted in FIG. 10.

Though the present invention may be put in book form, books on vocabulary building have the undesirable characteristics of both being cumbersome, expensive and repetitive. The present color coded vocabulary system provides a teaching aid and self-learning devices which overcome the aforementioned disadvantages of books. Our invention incorporates an inexpensive structure which may be of size and form convenient to carry in one's pocket, briefcase, or handbag and convenient to study, review or test vocabulary skill whenever one may have a moment to spare.

Another object of our invention is to provide an improved system of teaching. The materials are easily stored and readily used. Little preparation is required of the teacher. The words may be graded by the teacher for various levels of learning by simply selecting the words he feels the class may be ready to learn. He may present the vocabulary in the form of cards, books, transparencies, slides or other means suitable to the system itself. The testing devices described above for use by the student may be readily adapted in much the same way for the teacher.

Other objects, features and advantages of this invention will be apparent from the following detailed description, appended claims and the accompaning drawings:

BRIEF DESCRIPTION OF THE DRAWINGS

FIGS. 1a–4a are plan views of the reverse side of the cards of FIGS. 1–4,

FIGS. 1, 2, 3, and 4 are illustrated views of one side of color coded vocabulary cards containing a NOUN, ADJECTIVE, ADVERB, VERB, respectively, sample cards. Groups of similar preselected colored cards (i.e. noun, peach colored card; verb, yellow colored card, etc.) are included in a set of cards. The colors are chosen as an illustration. Our invention is not restricted by the colors mentioned; any combination of contrasting colors is the intent of the inventors. This stacking of similar color, coded to the parts of speech, is an example of a deck of the present invention.

FIGS. 1a, 2a, 3a, and 4a are plan views of the information presented on the reverse side (opposite meaning side) of a color coded vocabulary card of a NOUN, ADJECTIVE, ADVERB and VERB as illustrated in FIGS. 1, 2, 3, and 4.

More specifically FIGS. 1, 2, 3, and 4 and FIGS. 1a, 2a, 3a, and 4a are further described as follows:

Number 1 illustrates the "new word" to be learned. The vocabulary of a set of cards, incidentally, can be adjusted to different learning levels. The set illustrated is keyed to the high school student and college freshman or even sophomore as well as the adult, especially the junior executive or salesman;

Number 2 states the syllabication of the new word which is an aural as well as a visual presentation;

Number 3 gives the part(s) of speech of the new word, an indication of its place in sentence word order;

Number 4 repeats the new word in a typical usage in a sentence;

Number 5 gives the phonetic spelling of the new word, another aural and visual presentation;

Number 6 cites a synonym that is easier than the new word in the sense that the learner already knows its meaning;

Number 7 represents what should be a more difficult synonym that the new word being learned. In number 6 and 7 the definition of the new word, therefore, is suggested, the first synonym from the learner's already working vocabulary and the second for his recognition vocabulary;

Number 8 introduces an opposite of the new word;

Number 9 states an approximate opposite of the new word;

Number 10 cites the part of speech of the opposite which is the same as the new word;

Number 11, when present, gives a widely known word element(s) of the new word, i.e. prefix(s) suffix(s), and/or root(s). Further information concerning these elements are placed on a separate set of cards. This cross-referencing of the word elements further extends the usefulness of the vocabulary system in that the student is given keys to his increased recognition vocabulary.

Figure 1:
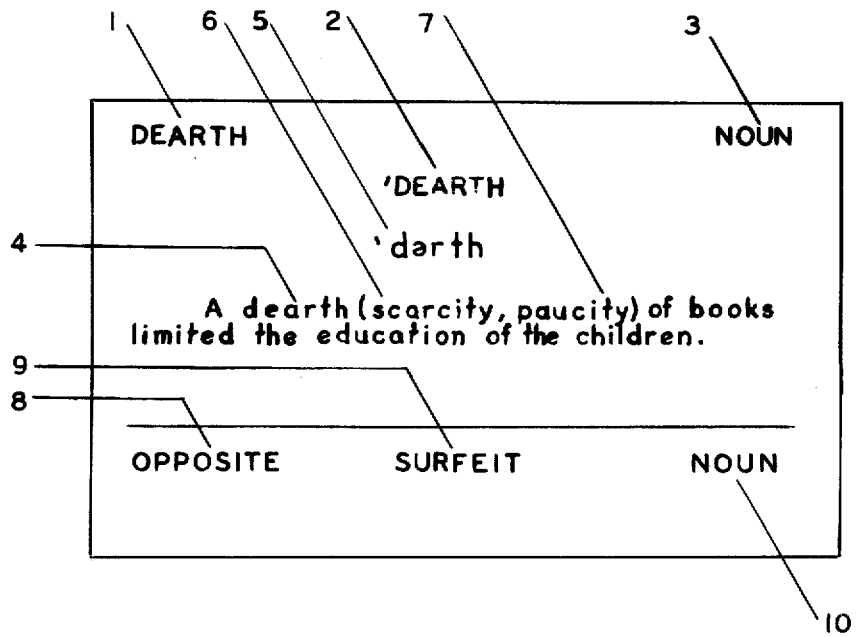
FIGS. 1–4 are plan views of one side of color coded vocabulary cards.
Figure 1A:
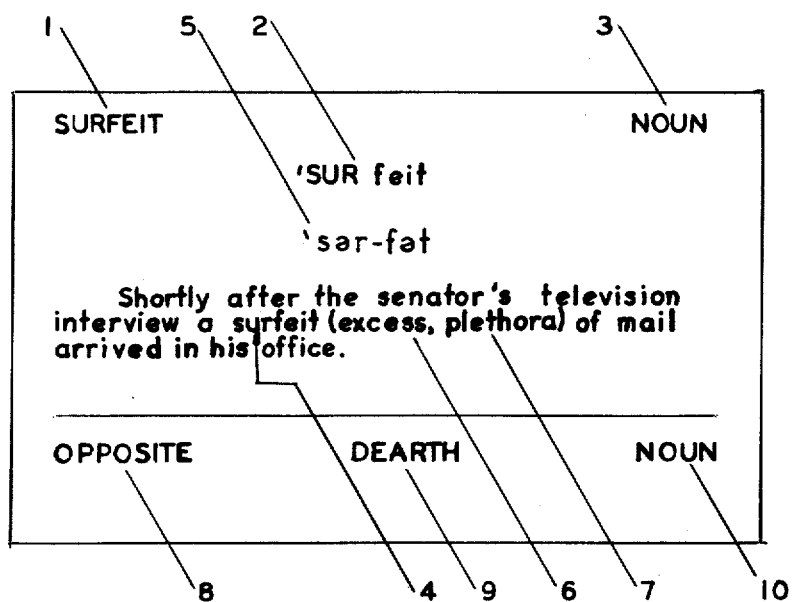
Figure 2:
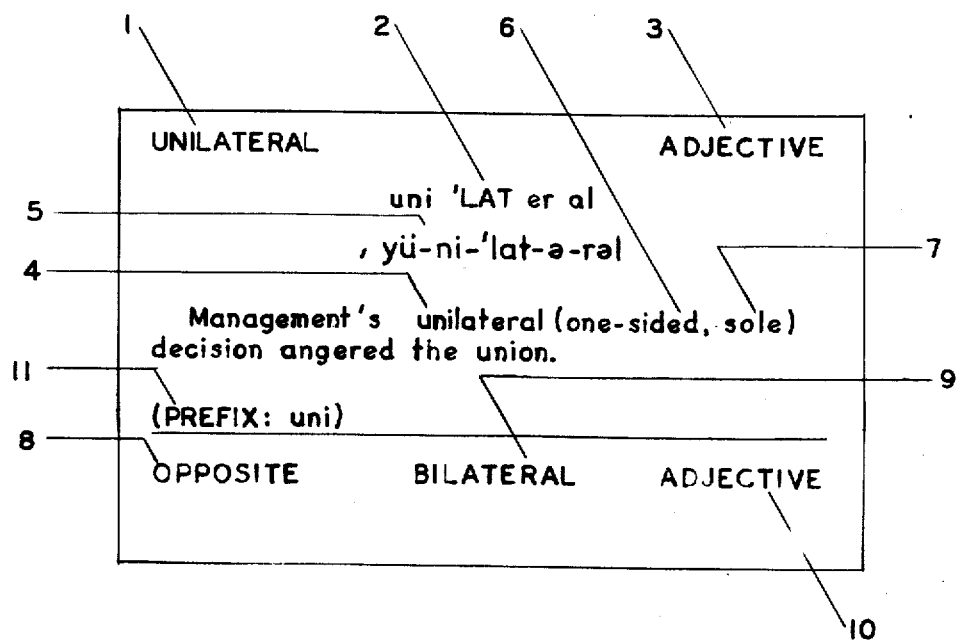
Figure 2A:
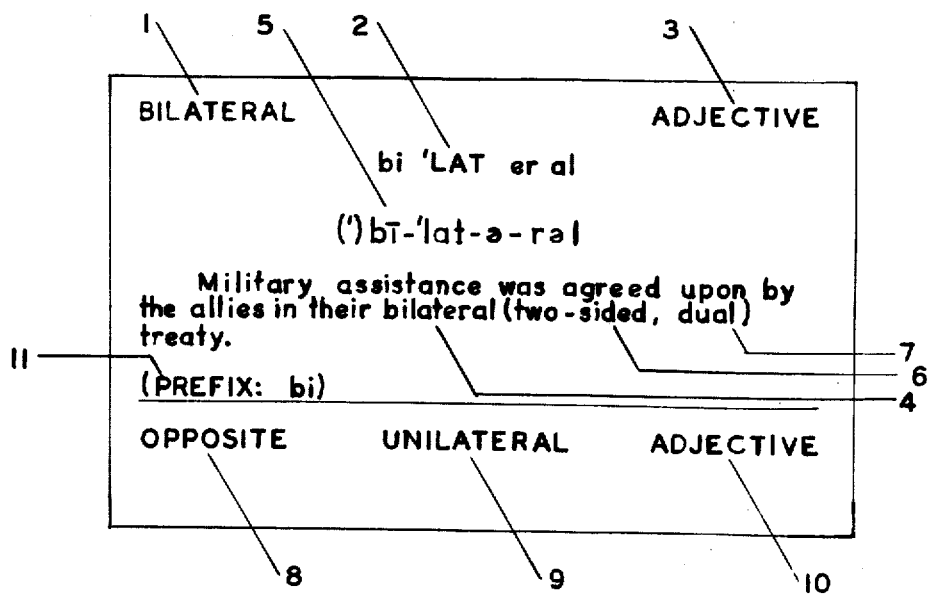
Figure 3:
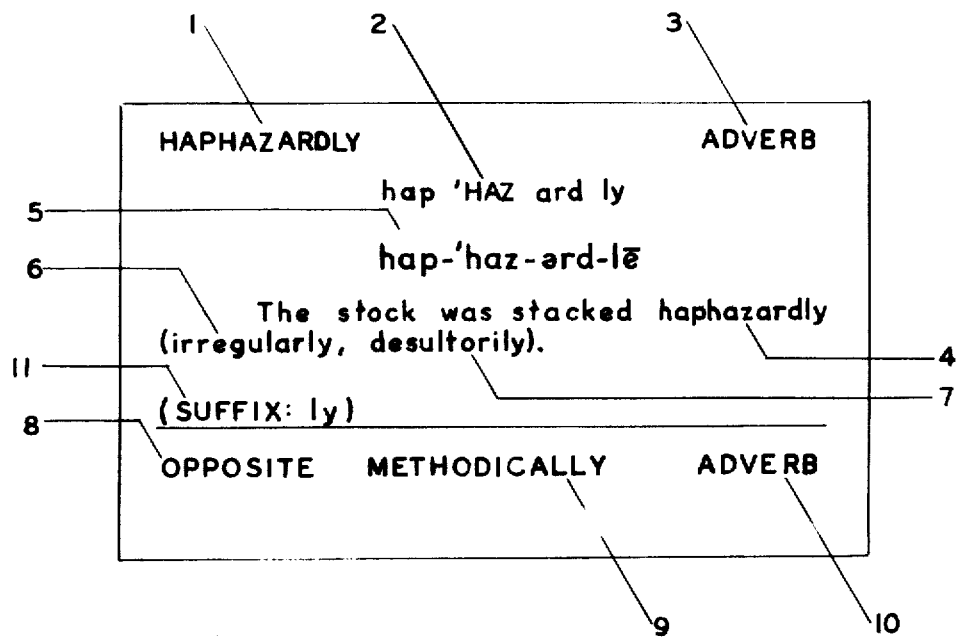
Figure 3A:
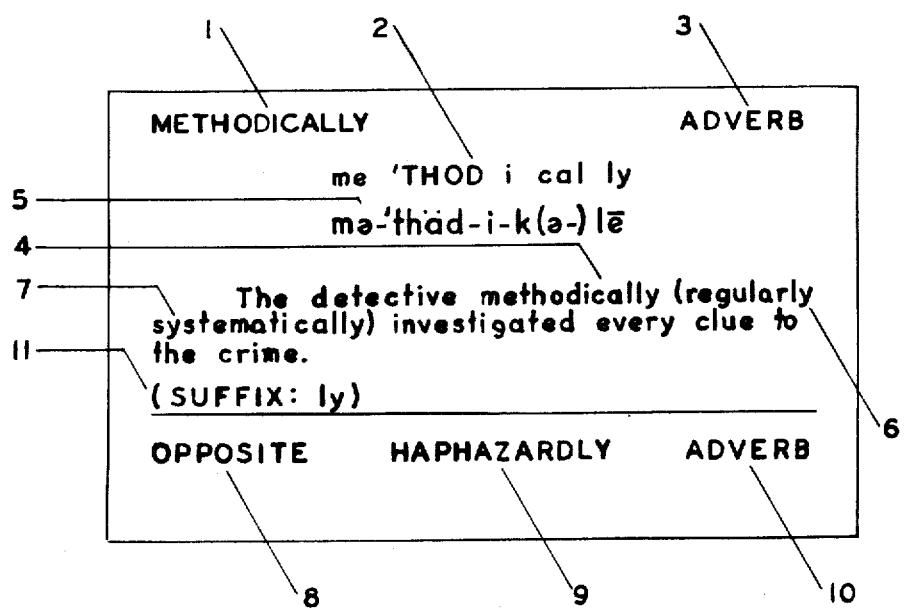
Figure 4:
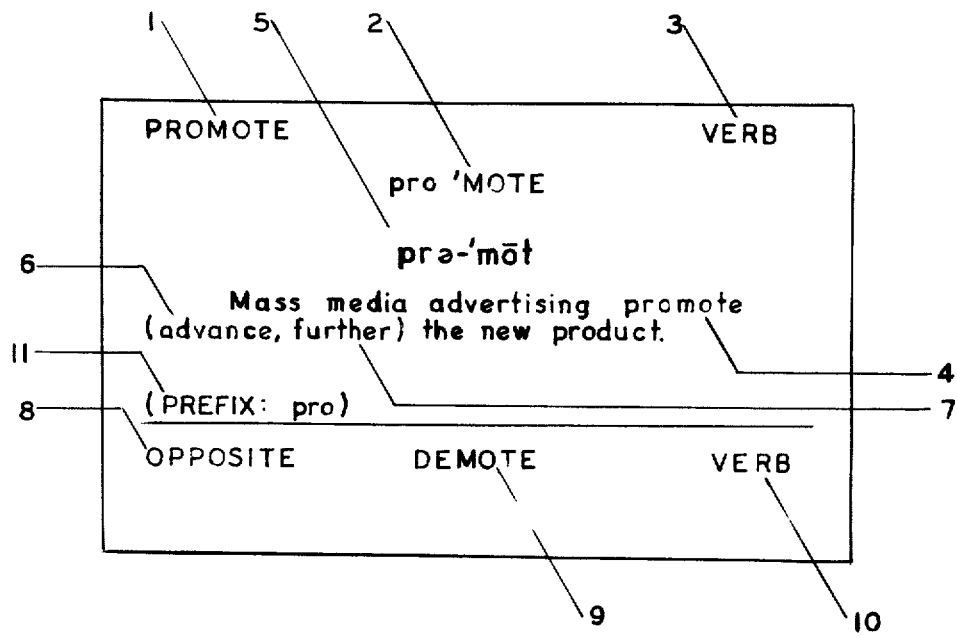
Figure 4A:
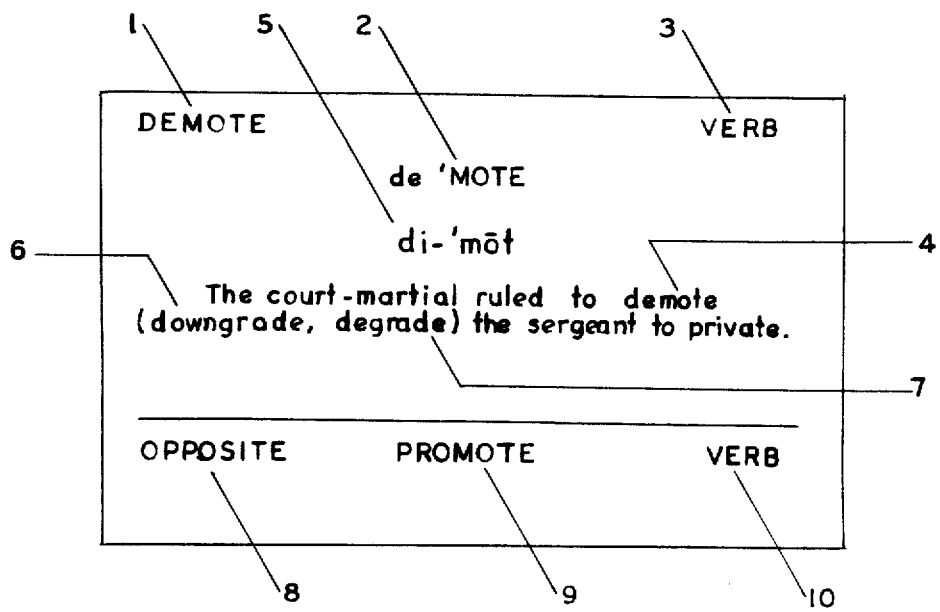
Figure 5:
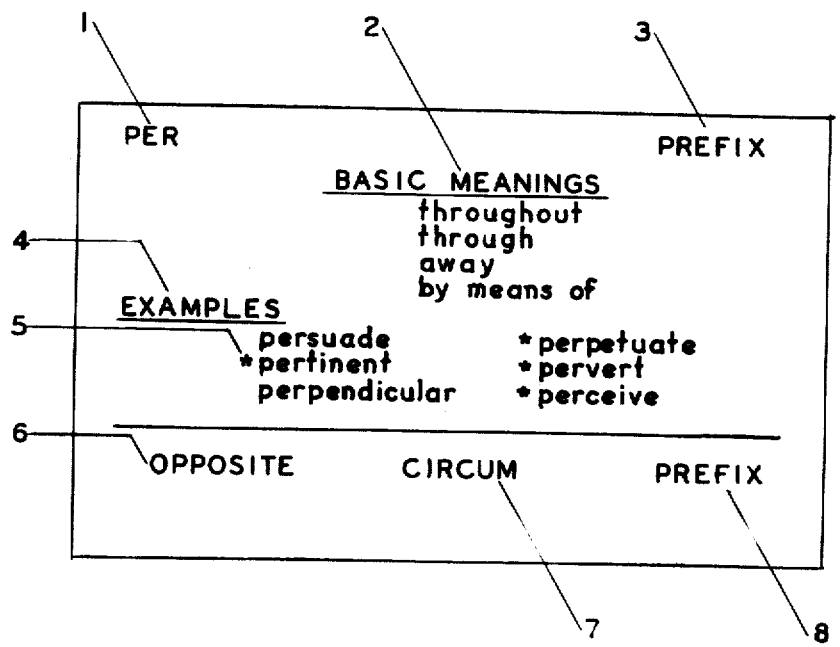
FIGS. 5–7 and 5a–7a are plan views of word element cards.
Figure 5A:
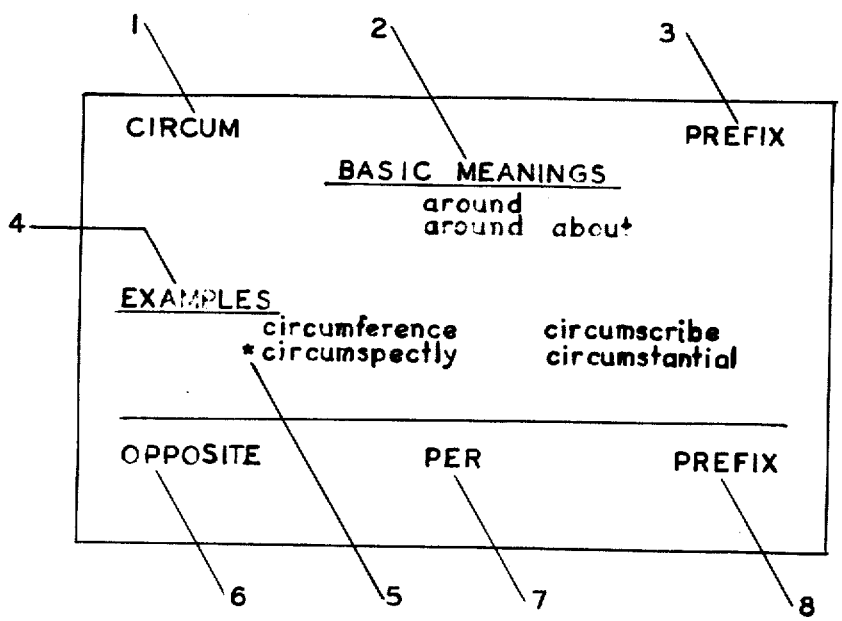
Figure 6:
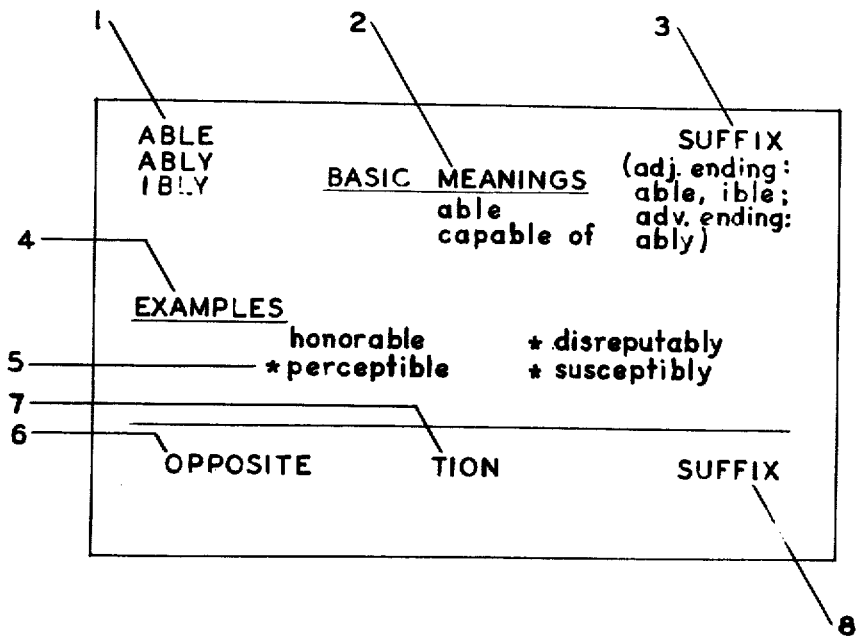
Figure 6A:
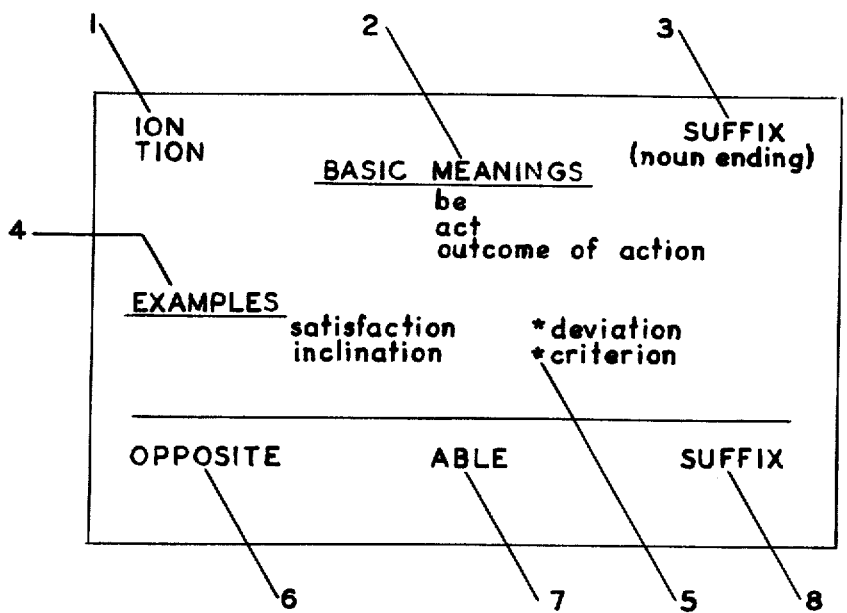
Figure 7:
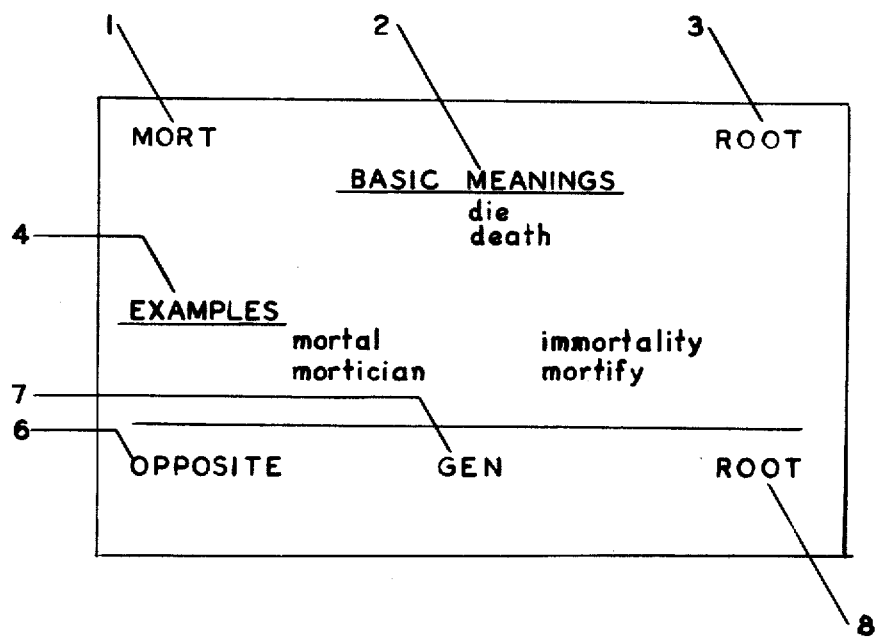
Figure 7A:
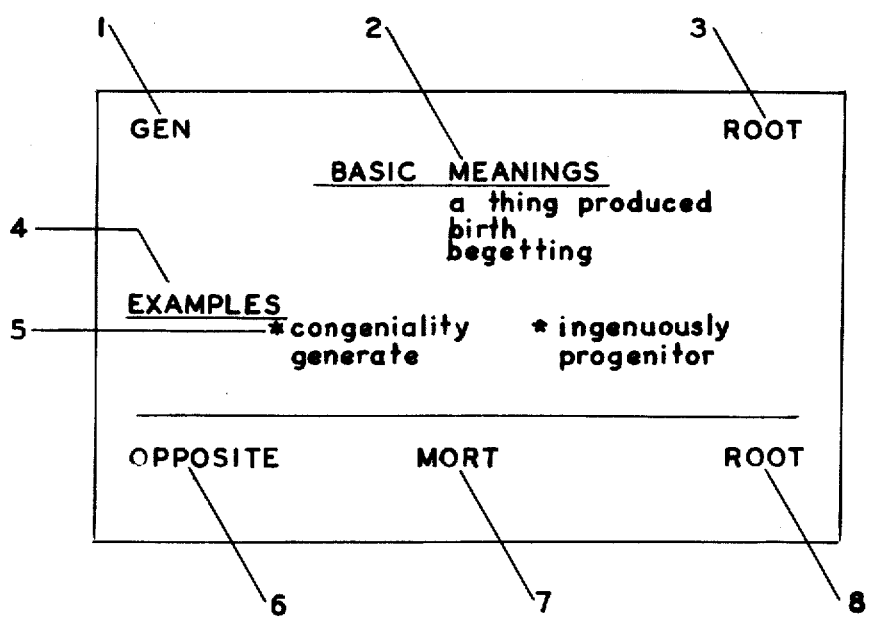

In general, FIGS. 5, 6 and 7 illustrate typical word element cards cross-referenced from the vocabulary cards of NOUNS, ADJECTIVES, ADVERBS AND VERBS. FIG. 5 shows a typical Prefix card, FIG. 6 a Suffix card and FIG. 7 a Root card.

FIGS. 5, 5a, 6, 6a, 7 and 7a are detailed as follows:

Number 1 states a word element(s) cross-referenced from the vocabulary cards;

Number 2 cites the basic meaning(s) of the word element;

Number 3 indicates the type of word element. When a word element has a wide grammatical usage, such as an adjective ending, this is stated under Number 3, see FIG. 6;

Number 4 gives examples of the word element in use in typical words, the element within the word may be printed in a different color, such as red;

Number 5 provides a cross-reference to the vocabulary cards, i.e. an asterisk indicates that the word used as an example may be found in the vocabulary cards either as a new word to be learned or as a synonym;

Number 6 introduces the opposite of the word element;

Number 7 states the opposite word element;

Number 8 cites the type of word element of the opposite.

Figure 8:
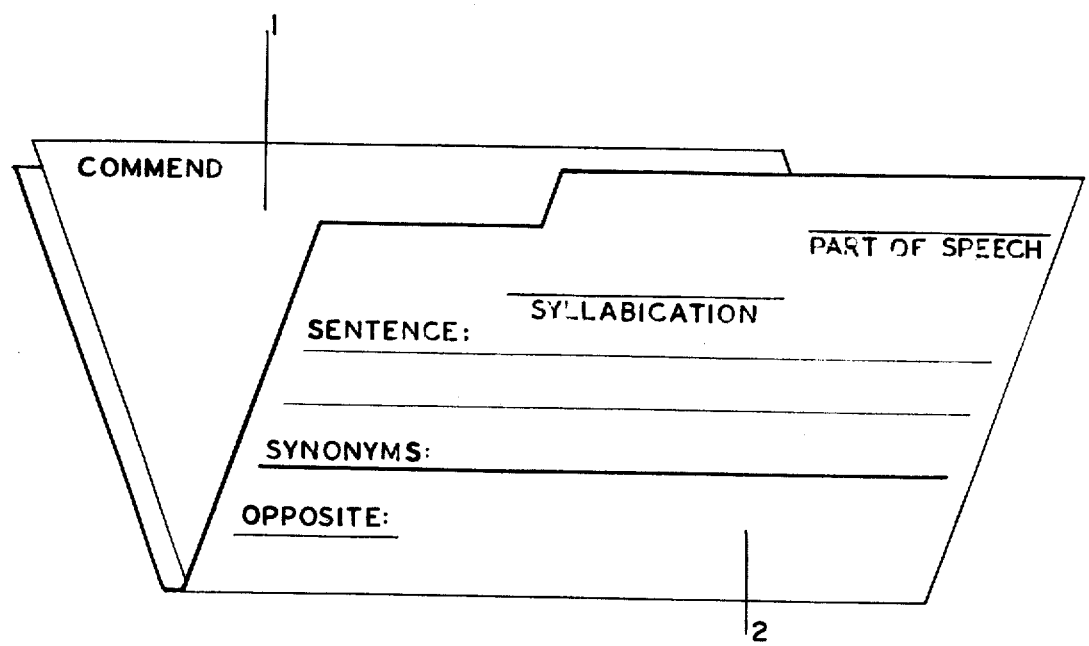
FIG. 8 is a perspective view of a quiz card holder.

FIG. 8 is a perspective view of a quiz card holder with a color coded vocabulary card inserted. This holder may be used for self-testing. FIG. 8 is further detailed as:

Number 1 shows the color coded vocabulary card inserted in the quiz card holder;

Number 2 presents a folded view of the quiz card holder with categories to be filled in by the learner. The holder could be made in plastic or other material with a surface that could take pencil and pencil erasures. The card holder when turned shows the opposite side of the vocabulary card indicating the aperture for exposing new word.

Figure 8A:
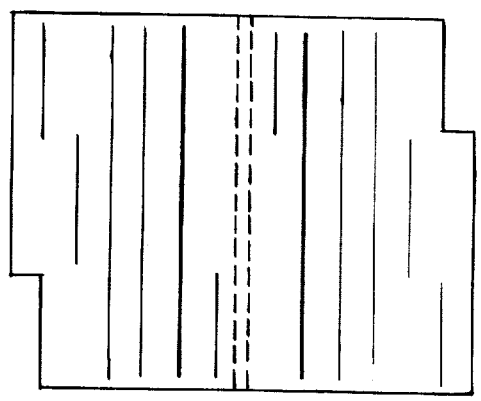
FIG. 8a is a plan view of the card holder.

FIG. 8a illustrates an open view of the quiz card holder.

Figure 9:
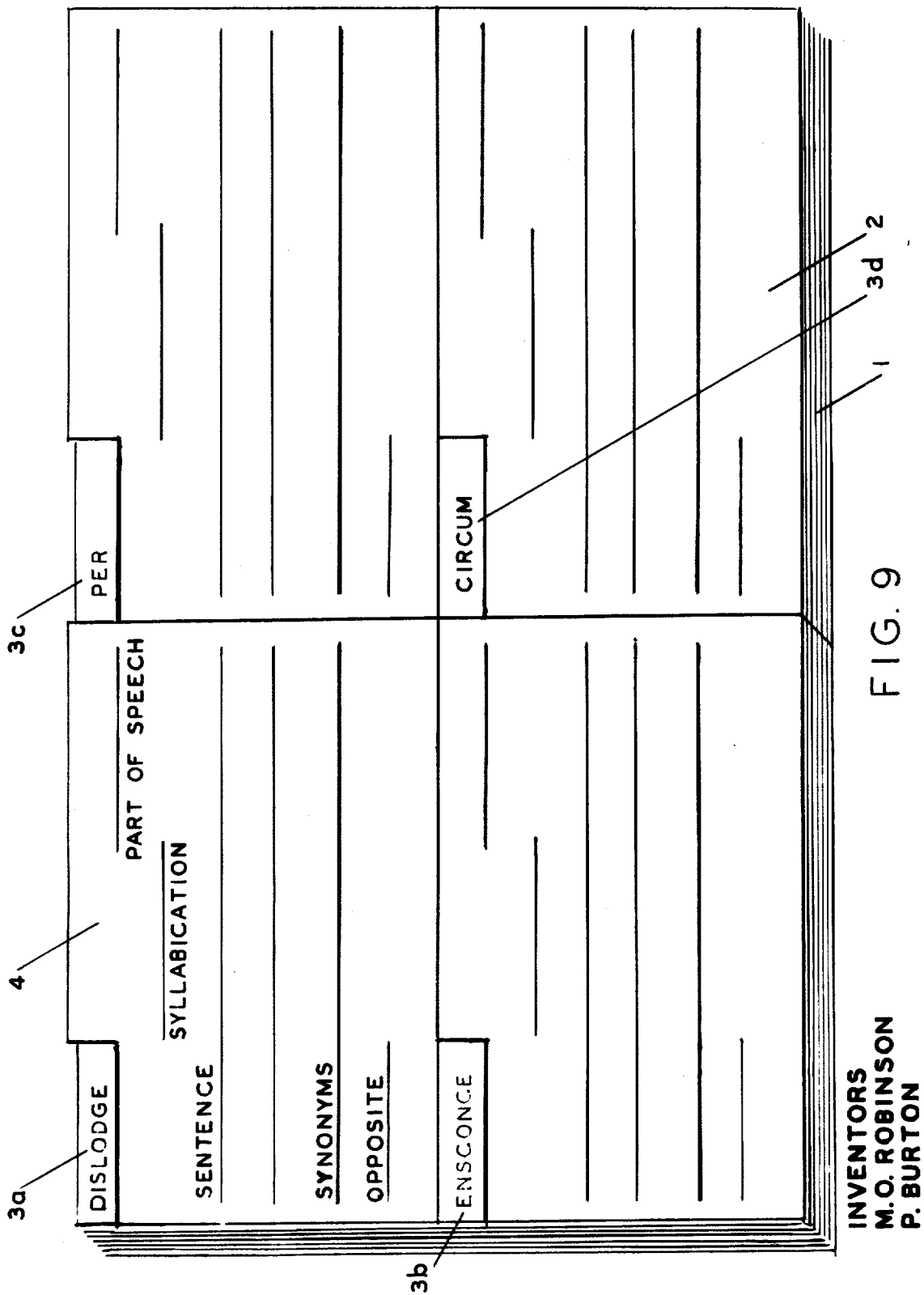
FIG. 9 is a perspective view of a quiz card shield over a book.

FIG. 9, in general, illustrates a quiz card shield superimposed over a book. The object of the quiz card shield is a self-test on the vocabulary and word element when these are incorporated in book form. This shield may be made in plastic or other material which will allow one to erase pencil marks easily. The shield should be of neutral color.

Figure 10:
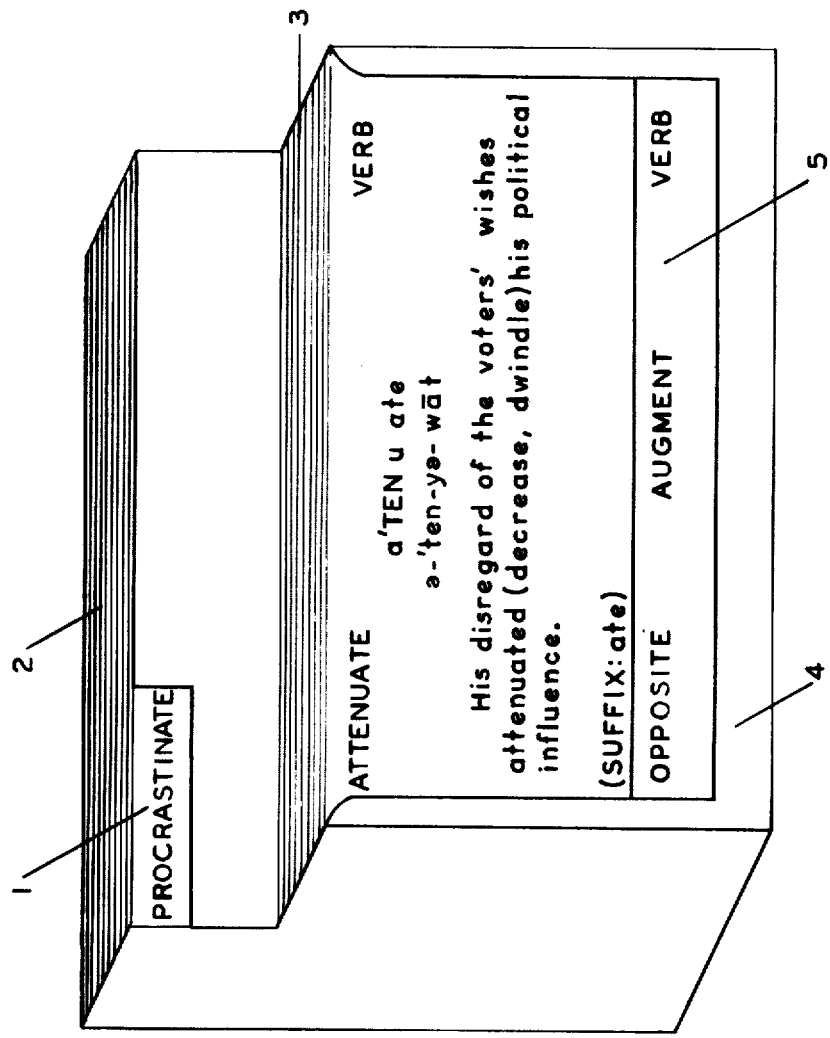
FIG. 10 is a perspective view of a desk top stand.

In particular, FIG. 9 is further detailed as:

Number 1 presents a book;

Number 2 shows the shield;

Numbers 3a, 3b, 3c and 3d illustrate the words in the book appearing through the cutaway of the card shield;

Number 4 presents the categories to be printed on card shield which the learner will try to fill in from memory after study of the vocabulary and/or word elements. FIG. 10, in general, presents a desk top stand, the object of which is to hold a set of cards as well as test oneself.

FIG. 10 is further detailed as:

Number 1 is an aperture which exposes the "new" word i.e., procrastinate, of a card which is being learned. The rest of the information is concealed. The object here is to test oneself on the concealed material;

Number 2 conceals a partial deck of cards in the upper part of the desk stand;

Number 3 encloses a lower deck of cards, the first of which exposes all the information of one card. The cards from Numbers 1 and 3 can be exchanged depending whether the student is learning or testing himself;

Number 4 is a section of the desk holder intended to store a complete deck of cards divided into two parts;

Number 5 exposes a selection of cards which exposes all the information to be studied.

As best seen in the drawings, the invention has been here shown as embodied in connection with a series of color coded vocabulary cards subject to ready manipulation. These color coded vocabulary cards are of a type and size similar to playing cards or the like with a dimension between three and eight inches in width and between five and eleven inches in length. Cards of this range of dimension are generally found most suitable for easy handling. In addition, the system is of simple construction which would enable production at low cost.

However, it will be apparent to those skilled in the art that the inventive concept may readily be employed in connection with a variety of different shapes or structures adapted to questions graphically imprinted thereon and answers graphically imprinted thereon.

It is thus seen that simple, effective teaching means have been provided for graphically presenting vocabulary learnings to students.

The above disclosure has been given by way of illustration and elucidation and not by way of limitation and

We claim:

1. A system for vacabulary self-instruction, comprising
   a. a word-bearing card color coded according to the part of speech of said word,
   b. said card bearing information with respect to said word,
   c. a holder for said card and bearing spaces for written student responses,
   d. said holder being formed with an aperture to expose said word on said card and mask said information,
   e. said holder being a transversely folded panel apertured at diagonally opposite corners and formed with a cleanable writing surface.

2. A set of vocabulary teaching cards, comprising
   a. a plurality of cards,
   b. each card bearing a selected word on one face thereof and color-coded according to the part of the speech of said word,
   c. each card also bearing information with respect to said word,
   d. a plurality of holders for said cards,
   e. each of said holders bearing word-related questions and spaces for responses thereto,
   f. each of said holders configured to mask said information and expose said word when superimposed on said card.

3. A set of vocabulary teaching cards, according to claim 2 wherein said holders are formed of a material having a cleanable writing surface.

* * * * *